US009151376B2

(12) United States Patent
Creager

(10) Patent No.: US 9,151,376 B2
(45) Date of Patent: Oct. 6, 2015

(54) LOCKING DIFFERENTIAL HAVING DAMPENING COMMUNICATION SPRING

(71) Applicant: Eaton Corporation, Cleveland, OH (US)

(72) Inventor: Christopher W. Creager, Ypsilanti, MI (US)

(73) Assignee: Eaton Corporation, Cleveland, OH (US)

( * ) Notice: Subject to any disclaimer, the term of this patent is extended or adjusted under 35 U.S.C. 154(b) by 78 days.

(21) Appl. No.: 14/013,262

(22) Filed: Aug. 29, 2013

(65) Prior Publication Data

US 2014/0162828 A1 Jun. 12, 2014

Related U.S. Application Data

(60) Provisional application No. 61/694,479, filed on Aug. 29, 2012.

(51) Int. Cl.
*F16H 48/19* (2012.01)
*F16H 48/22* (2006.01)

(52) U.S. Cl.
CPC ............... *F16H 48/22* (2013.01); *F16H 48/19* (2013.01)

(58) Field of Classification Search
CPC ...................................................... F16H 48/19
USPC .......... 475/223, 230, 233, 235, 238, 240, 236
See application file for complete search history.

(56) References Cited

U.S. PATENT DOCUMENTS

| 3,186,258 | A | * | 6/1965 | Meldola ...................... 475/234 |
| 3,253,483 | A | | 5/1966 | McCaw |
| 3,264,900 | A | | 8/1966 | Hartupee |
| 3,611,833 | A | | 10/1971 | Baremor |
| 3,886,813 | A | | 6/1975 | Baremor |
| 3,906,812 | A | | 9/1975 | Kagata |
| 4,136,582 | A | | 1/1979 | Boor |
| 4,498,355 | A | | 2/1985 | Schou |
| 4,735,108 | A | | 4/1988 | Teraoka et al. |

(Continued)

FOREIGN PATENT DOCUMENTS

EP     0 091 747 A2    10/1983
EP     0 683 333 A1    11/1995

(Continued)

OTHER PUBLICATIONS

U.S. Appl. No. 14/203,816, filed Mar. 11, 2014 entitled "Inboard Spring Arrangement for a Clutch Actuated Differential".

(Continued)

*Primary Examiner* — Justin Holmes
*Assistant Examiner* — Stacey Fluhart
(74) *Attorney, Agent, or Firm* — Merchant & Gould P.C.

(57) ABSTRACT

A locking differential for a vehicle includes a rotatable housing and a differential mechanism supported in the housing. The differential mechanism includes a pair of clutch members wherein each of the clutch members presents an inwardly directed face. Each face includes a groove disposed in spacing relationship with respect to the other. A cross pin is received in the groove and is operatively connected for rotation with the housing. A dampening communication spring is disposed over an outer circumference of the clutch members and cooperates with the cross pin to control interaction of the clutch members.

19 Claims, 5 Drawing Sheets

(56) References Cited

U.S. PATENT DOCUMENTS

| | | | |
|---|---|---|---|
| 4,754,661 | A | 7/1988 | Barnett |
| 4,845,831 | A | 7/1989 | Schou |
| 4,865,173 | A | 9/1989 | Leigh-Monstevens et al. |
| 4,903,809 | A | 2/1990 | Kiblawi et al. |
| 4,939,953 | A | 7/1990 | Yasui |
| 4,978,329 | A | 12/1990 | Yasui et al. |
| 5,019,021 | A | 5/1991 | Janson |
| 5,413,015 | A | 5/1995 | Zentmyer |
| 5,441,131 | A | 8/1995 | Mayer et al. |
| 5,603,397 | A | 2/1997 | Meyers |
| 5,715,733 | A * | 2/1998 | Dissett ............... 74/650 |
| 5,727,430 | A * | 3/1998 | Valente ............... 74/650 |
| 5,823,908 | A | 10/1998 | Stefanek |
| 5,901,618 | A | 5/1999 | Tyson et al. |
| 5,971,120 | A | 10/1999 | Bessemer et al. |
| 6,062,105 | A | 5/2000 | Tyson et al. |
| 6,083,134 | A | 7/2000 | Godlew |
| 6,105,465 | A | 8/2000 | Tyson et al. |
| 6,374,701 | B1 | 4/2002 | Tittjung |
| 6,394,927 | B1 | 5/2002 | Bongard |
| 6,463,830 | B1 | 10/2002 | Ito et al. |
| 6,491,126 | B1 | 12/2002 | Robison et al. |
| 6,607,062 | B1 | 8/2003 | Heatwole et al. |
| 6,688,194 | B2 | 2/2004 | Dissett et al. |
| 6,884,196 | B1 | 4/2005 | Ziech |
| 7,104,912 | B2 | 9/2006 | Morgensai |
| 7,178,420 | B2 | 2/2007 | Barth |
| 7,264,569 | B2 | 9/2007 | Fox |
| 7,311,632 | B2 | 12/2007 | Dissett et al. |
| 7,361,115 | B2 | 4/2008 | Morgensai |
| 7,823,711 | B2 | 11/2010 | Uhler et al. |
| 7,874,954 | B2 | 1/2011 | Dissett et al. |
| 8,146,458 | B2 | 4/2012 | Radzevich |
| 2002/0132694 | A1 * | 9/2002 | Okazaki ............... 475/231 |
| 2003/0066386 | A1 | 4/2003 | Dissett et al. |
| 2004/0237689 | A1 | 12/2004 | Hiltbrand |
| 2005/0288144 | A1 * | 12/2005 | Wang et al. ........... 475/221 |
| 2008/0060474 | A1 | 3/2008 | Mizukawa et al. |
| 2008/0103008 | A1 | 5/2008 | Gleasman et al. |
| 2008/0176703 | A1 | 7/2008 | Hoberg |
| 2008/0190240 | A1 | 8/2008 | Dissett et al. |
| 2009/0011890 | A1 | 1/2009 | Bawks |
| 2010/0113208 | A1 | 5/2010 | Haugeberg |
| 2010/0276243 | A1 | 11/2010 | Arhab et al. |
| 2011/0021304 | A1 | 1/2011 | Radzevich |
| 2011/0021306 | A1 | 1/2011 | Radzevich |
| 2014/0141920 | A1 | 5/2014 | Creager |
| 2014/0171252 | A1 | 6/2014 | Creager |

FOREIGN PATENT DOCUMENTS

| | | |
|---|---|---|
| EP | 0 838 612 A2 | 4/1998 |
| EP | 1 767 817 A1 | 3/2007 |
| EP | 1 898 124 A2 | 3/2008 |
| FR | 769 239 | 8/1934 |
| FR | 2 382 627 A1 | 9/1978 |
| WO | WO 2005/111471 A1 | 11/2005 |
| WO | WO 2014/085554 A1 | 6/2014 |

OTHER PUBLICATIONS

International Search Report and Written Opinion for for PCT/US2013/056585 mailed Apr. 17, 2014.

Invitation to Pay Additional Fees with Partial International Search for PCT/US2013/056585 mailed Jan. 21, 2014.

\* cited by examiner

LOCKING DIFFERENTIAL HAVING DAMPENING COMMUNICATION SPRING

CROSS REFERENCE TO RELATED APPLICATIONS

This application claims the benefit of U.S. Provisional Application Ser. No. 61/694,479, filed Aug. 29, 2012, entitled LOCKING DIFFERENTIAL HAVING DAMPENING COMMUNICATION SPRING, which is incorporated herein by reference in its entirety.

BACKGROUND

1. Field Teachings

The present teachings relate generally to locking differentials for vehicles and, more specifically, to features of a locking differential having a dampening communication spring.

2. Description of the Related Art

Locking differentials of the type contemplated by the present teachings are employed as a part of a drive train and generally include a pair of clutch members supported for rotation in a housing. A pair of side gears are splined for rotation to corresponding axle half shafts. A clutch mechanism is interposed between the clutch members and the side gears. A cross pin is operatively mounted for rotation with the housing and is received in a pair of opposed grooves formed on the inwardly facing surfaces of the clutch members. In an event requiring differential rotation between the axle half shafts, such as cornering, the higher speed axle shaft advances its clutch to an over-running condition, decoupling it from the powertrain torque. If the driving terrain provides insufficient traction to activate the over-running feature of the differential, or while driving in a straight line, torque is applied equally to both axle shafts.

While locking differentials of this type have generally worked for their intended purposes, certain disadvantages remain. More specifically, the interaction of the clutch members. There are currently mechanical limiters on the interaction. However, these limiters do not prevent erratic motion within the mechanical travel limits. As a result, rougher operation and increased noise may occur. In addition, feedback to the clutch members from the differential carrier is limited to the influence of the preloaded clutch member geometry and force interface with the cross pin.

Thus, there remains a need in the art for a locking differential that is designed so as to achieve control of the interaction of the clutch members, thereby providing for smoother operation and reduced noise.

SUMMARY

The present teachings include a locking differential for a vehicle including a rotatable housing and a differential mechanism supported in the housing. The housing is rotatable about an axis of rotation. The differential mechanism includes a pair of clutch members disposed in spaced axial relationship with respect to one another along the axis of rotation. A pair of side gears is operatively adapted for rotation about the axis of rotation about the axis of rotation with a corresponding pair of axle half shafts. A pair of clutch mechanisms is operable for transferring torque between corresponding clutch members and the side gears when actuated. The clutch members are axially moveable within the housing along the axis of rotation to actuate a respective clutch mechanism. Each of the clutch members presents an inwardly directed face. Each face includes a groove disposed in facing relationship with respect to the other. A cross pin is received in the grooves and operatively connected for rotation with the housing about the axis of rotation. A dampening communication spring is disposed over an outer circumference of the clutch members and cooperates with the cross pin to control interaction of the clutch members.

In one aspect of the present teachings, during normal, non-differentiated movement between the axle half shafts, such as when a vehicle is driving in a straight path down a road, the line contact is more than sufficient to transfer torque between the cross pin and the clutch members because all the components rotate together. However, in the event of differential movement between one or the other of the axle half shaft and its associated side gear, the binding force generated by the preloaded clutch mechanism causes the clutch member to advance in rotation, relative to the cross pin. This action causes the cross pin to re-center in the groove per the interlock limitations, and allows the clutch mechanism to rotate with a binding force under the threshold required to transmit torque between the clutch member and the side gear. By applying a dampening communication spring between the clutch members and cooperating with the cross pin, varying degrees of control of the interaction of the clutch members may be achieved. The dampening communication spring can positively influence or even prevent erratic motion within the mechanical travel limits. The dampening communication spring provides for smoother operation and reduced noise. The dampening communication spring also provides feedback to the differential clutch members from the differential carrier. This results in ultimate control of the dampening back to the driveline.

BRIEF DESCRIPTION OF THE DRAWINGS

Other aspects of the present teachings will be readily appreciated, as the same becomes better understood after reading the subsequent description taken in connection with the accompanying drawings wherein.

DETAILED DESCRIPTION

Figure 1:
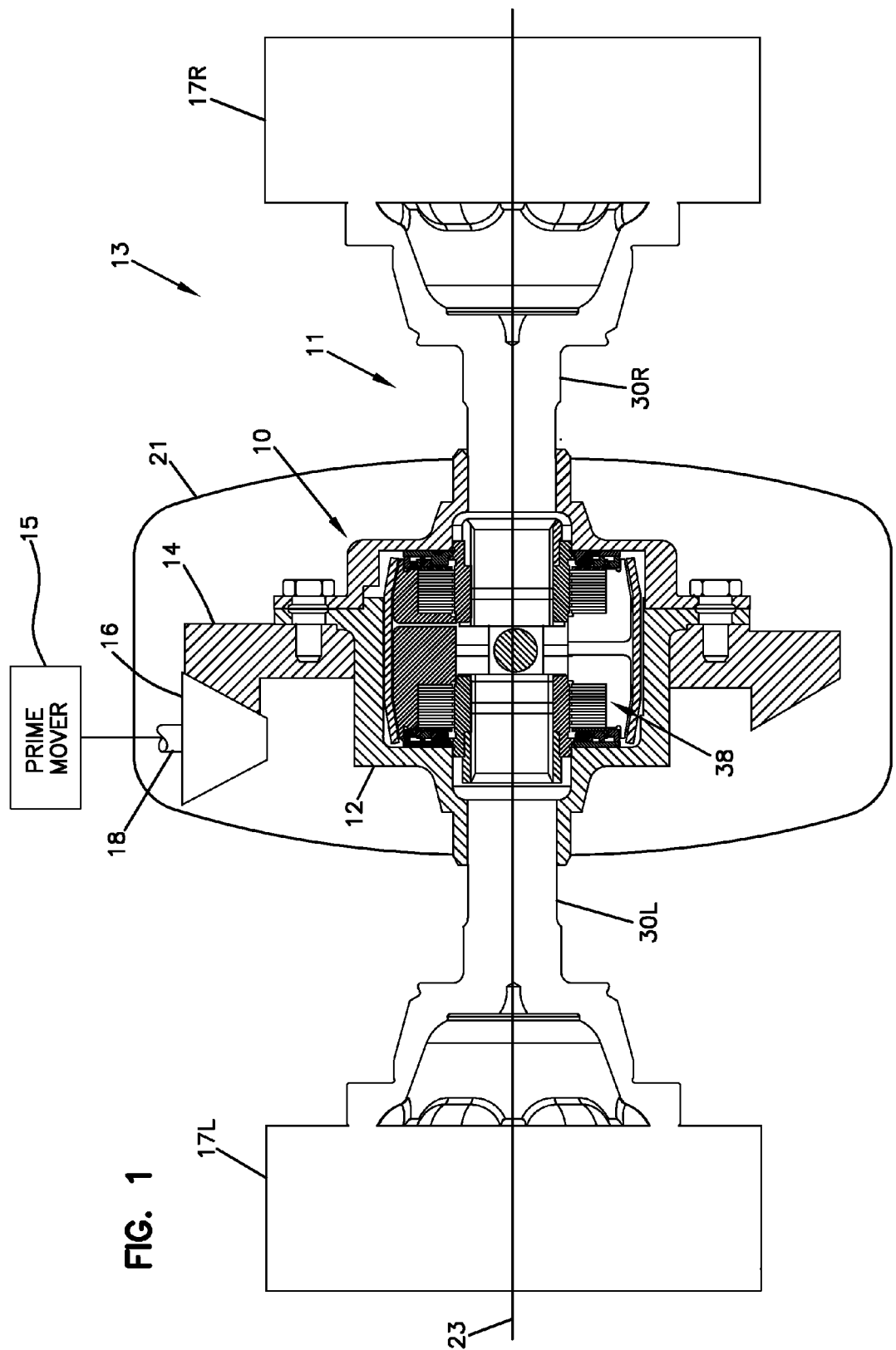
FIG. 1 is a schematic cross-sectional view of an axle assembly including a differential in accordance with the principles of the present disclosure.

FIG. 1 illustrates an axle assembly 11 incorporating a differential 10 in accordance with the principles of the present disclosure. The axle assembly 11 is part of a drive train 13 used to transfer torque from a prime mover 15 (e.g., an engine, a motor, or like power source) to left and right wheels 17L, 17R. The differential 10 includes a differential housing 12 (i.e., a differential case) and a differential mechanism 38 (i.e., a differential torque transfer arrangement) positioned within the differential housing 12. The differential housing 12 carries a gear 14 (e.g., a ring gear) that intermeshes with a drive gear 16 driven by a driveshaft 18 of the drivetrain 13. The differential mechanism 38 is configured to transfer torque from the differential housing 12 to left and right half axle half shafts 30L, 30R that respectively correspond to the left and right wheels 17L, 17R. The differential 10 is enclosed within an axle housing 21 that protects the differential 10 and contains lubricant (e.g., oil) for lubricating moving parts within the axle housing 21. The differential housing 12 is mounted to rotate relative to the axle housing 21 about an axis of rotation 23. In one example, bearings can be provided between the differential housing 12 and the axle housing 21 to allow the differential housing 12 to freely rotate about the axis of rotation 23 relative to the axle housing 21. The left and right axle half shafts 30L, 30R are co-axially aligned along the axis of rotation 23.

In certain examples, the axle assembly 11 can be incorporated into a vehicle such as an all-terrain vehicle, a light utility vehicle, or other type of vehicle. The differential 10 of the axle assembly 11 is configured to prevent individual wheel spin and to provide enhanced traction performance on a variety of surfaces such as mud, wet pavement, loose dirt and ice. In use, torque for rotating the differential housing 12 about the axis of rotation 23 is provided by the drive gear 16 that intermeshes with the ring gear 14 carried by the differential housing 12. The differential mechanism 38 includes left and right clutches (e.g., disc style clutches) configured to transfer torque from the rotating differential housing 12 to the left and right axle half shafts 30L, 30R thereby driving rotation of the left and right wheels 17L, 17R. When the vehicle is driven straight, the left and right clutches are both actuated such that torque from the differential housing 12 is transferred equally to the left and right axle shafts 30L, 30R. When the vehicle turns right, the left clutch is de-actuated while the right clutch remains actuated. In this state, the differential mechanism 38 continues to drive rotation of the right axle shaft 30R while the left axle shaft 30L is allowed to free wheel at a higher rate of rotation than the right axle shaft 30R. When the vehicle makes a left turn, the right clutch is de-actuated while the left clutch remains actuated. In this state, the differential mechanism 38 continues to drive rotation of the left axle shaft 30L while the right axle shaft 30R is allowed to free wheel at a higher rotational speed than the left axle shaft 30L.

It will be appreciated that the differential housing 12 can also be referred to as a differential carrier, a ring gear carrier, a carrier, a differential casing, or like terms. Also, the axle housing 21 can be referred to as a carrier housing, a service housing or like terms.

Figure 2:
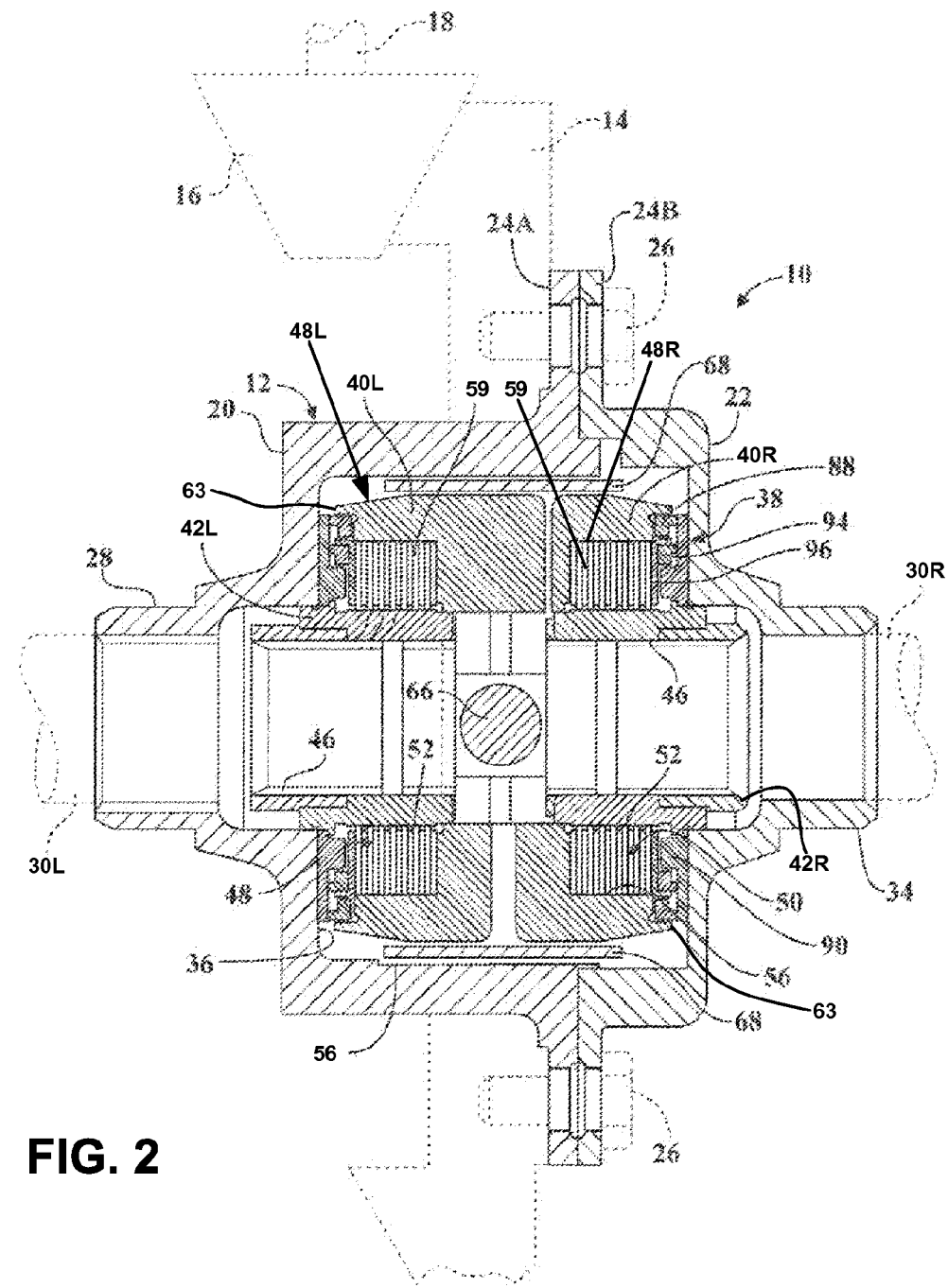
FIG. 2 is a cross-sectional side view of a locking differential of the present teachings illustrating a drive shaft, pinion gear and ring gear of the drive train in phantom.
Figure 3:
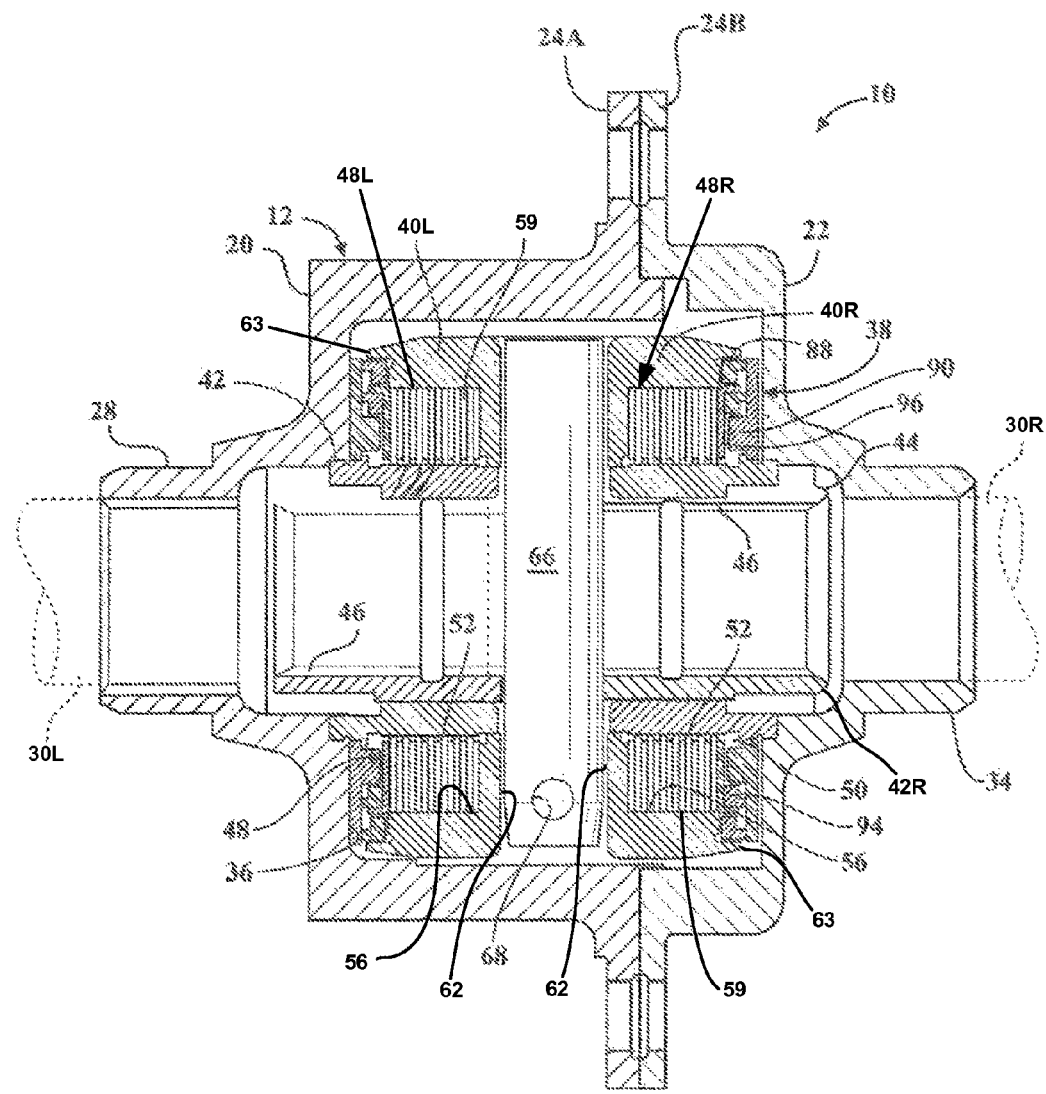
FIG. 3 is a cross-sectional side view of a locking differential of the present teachings illustrating the disposition of the cross pin relative to the clutch members.

Referring to FIGS. 2 and 3, the differential housing 12 may be composed of a main body 20 and a cap 22 that is fixedly mounted to the main body 20 at a pair of mating annular flange portions 24A and 24B via fasteners 26 or any other suitable fastening mechanism. The ring gear 14 may also be mounted to the housing 12 at the mating flanges 24A, 24B via the fastener 26. Those skilled in the art will appreciate in light of the disclosure that follows that the housing 12 may be defined by any conventional structure known in the related art and that the present teachings are not limited to a housing defined by a main body and a cap portion. Similarly, the housing 12 may be driven by any conventional drive mechanism known in the related art and that the present teachings are not limited to a housing that is driven via a ring gear, pinion gear, and drive shaft.

The main body 20 defines a hub 28 that supports the left axle shaft 30L (e.g., via a rotational bearing) to allow for rotation relative to the housing 12 about the axis of rotation 23. Similarly, the cap 22 defines an opposed hub 34 that supports the right axle half shaft 30R (e.g. via a rotational bearing) to allow for rotation relative to the housing 12 about the axis of rotation 23. Together, the main body 20 and cap 22 of the case 12 cooperate to define a cavity 36. The differential mechanism 38, is supported in the cavity 36 defined by the housing 12.

Figure 4:
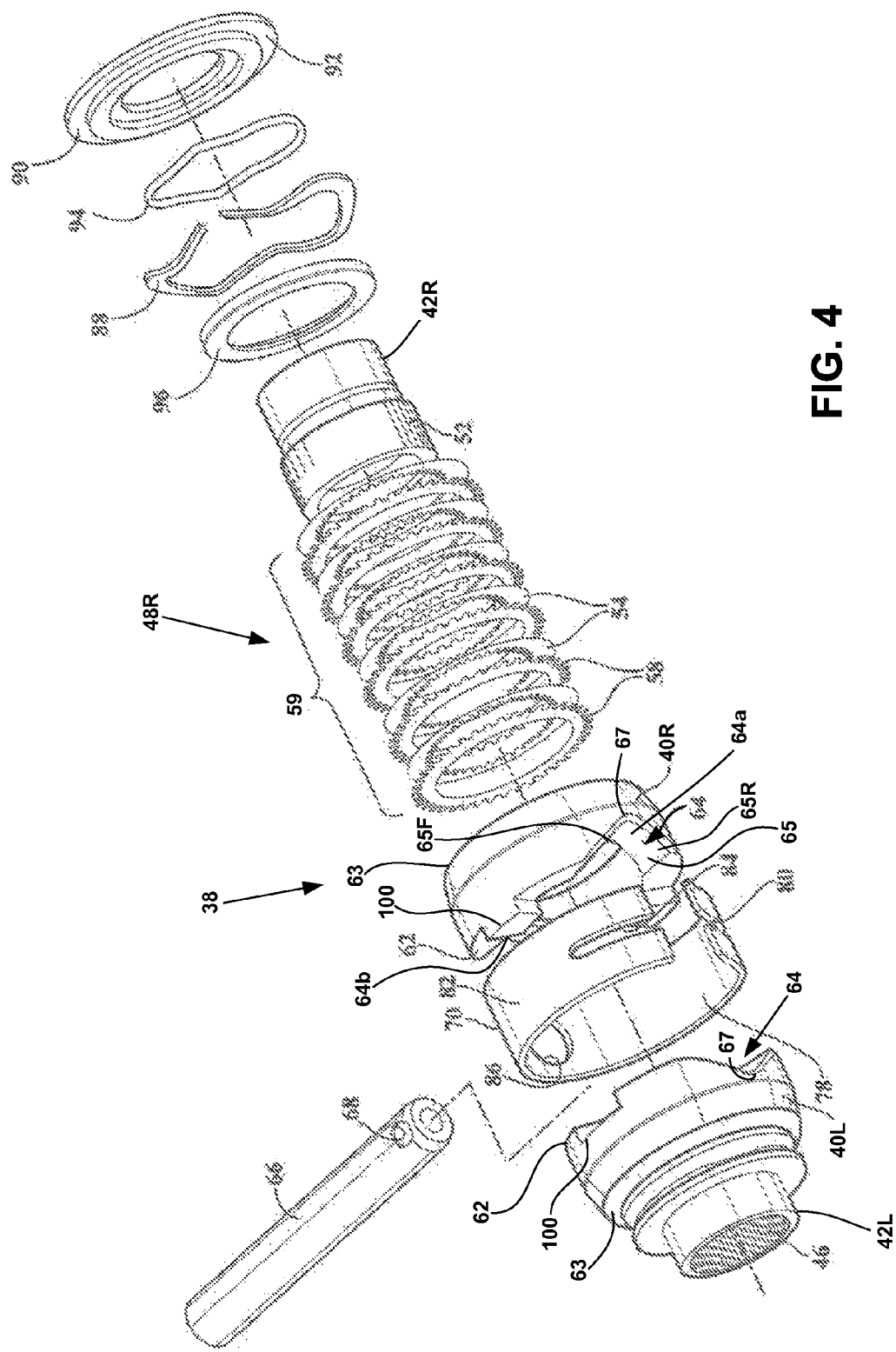
FIG. 4 is an exploded perspective view of one end of the differential mechanism and dampening communication spring of the present teachings.

The differential mechanism 38 is also illustrated in the exploded view of FIG. 4. The differential mechanism 38 includes left and right clutch members 40L, 40R disposed in spaced axial relationship with respect to one another. The clutch members 40L, 40R are operatively supported for rotation with the housing 12. Left and right side gears 42L, 42R are each operatively adapted for rotation with a corresponding one of the left and right axle half shafts 30L, 30R. To this end, the side gears 42L, 42R each define a plurality of splines 46 on the inner circumference thereof that are matingly received in corresponding splines defined on their corresponding axle half shafts 30L, 30R. Left and right clutch mechanisms 48L, 48R are operatively disposed between the clutch members 40L, 40R and their corresponding side gears 42L, 42R. When actuated, the clutch mechanisms 48L, 48R are configured to transfer torque from the clutch members 40L, 40R to their respective side gears 42L, 42R so as to resist or prevent relative rotation about the axis of rotation 23 between the clutch members 40L, 40R and their respective side gears 40L, 40R. The side gears 42L, 42R include a plurality of splines 52 on the outer circumference thereof. The clutch mechanism 48L, 48R include a plurality of friction disks 54 that are cooperatively splined to the outer circumference of the side gears 42L, 42R and are rotatable therewith. Similarly, each of the clutch members 40L, 40R includes a plurality of splines 56 formed on the inner circumference thereof. A series of plates 58 have outer splines that engage the splined inner circumference 56 of the left and right clutch members 40L, 40R. The plates 58 are interleaved between the friction disks 54 supported on the side gears 42L, 42R. The plates 58 and the friction discs 54 form clutch packs 59. The clutch members 40L, 40R are axially moveable within the housing 12 to engage/actuate their respective clutch mechanism 48L, 48R by axially compressing together the plates 58 and friction discs 54 (i.e., the clutch packs 59). When the clutch mechanisms 48L, 48R are actuated, torque is transferred from the clutch members 40L, 40R, through the clutch packs 59 to the side gears 42L, 42R and their corresponding axle half shafts 30L, 30R. When both clutch mechanisms 48L, 48R are fully actuated, the housing 12, the clutch members 40L, 40R, the side gears 42L, 42R and the axle half shafts 30L, 30R all rotate in unison with each other about the axis of rotation 23. One representative example of the locking differential 10 of the type contemplated by the present teachings may also employ a plurality of biasing members (not shown) that are disposed between the clutch members 40L, 40R and received in pockets (not shown) formed in the opposed clutch members 40L, 40R to urge the clutch members 40L, 40R away from one another to pre-load the clutch packs 59.

Referring to FIG. 3, the clutch members 40L, 40R present inwardly directed faces 62 (i.e., inboard sides) that face toward a cross shaft or pin 66 mounted between the clutch members 40L, 40R. The clutch members 40L, 40R also include outwardly directed faces 63 (i.e., outbound sides) that face away from the pin 66. The inwardly directed faces 62 of the clutch members 40L, 40R oppose each other and are disposed in spaced axial relationship to one another. Each of the inwardly directed faces 62 of the clutch members 40 includes a groove 64 disposed in facing relationship with respect to the other. The cross pin 66 is received in the grooves 64 and is operatively connected for rotation with the housing 12 about the axis 23. The cross pin 66 is generally cylindrical in shape and has an aperture 68 extending radially therethrough at one end. Opposite ends of the cross pin 66 can fit within corresponding radial openings defined by the housing 12 and the aperture 68 allows the cross pin 66 to be pinned in place relative to the housing 12 to prevent the cross pin 66 from sliding along its axis relative to the housing 12. The grooves 64 are defined at the inwardly directed faces 62 of the clutch members 40L, 40R. Each groove 64 is defined by ramp surfaces 65 that converge toward a neutral position 67. The neutral positions 67 form the deepest portions of the grooves 64. The clutch members 40L, 40R can rotate a limited amount relative to the cross pin 66 about the axis 23 between actuated positions where the cross pin 66 engages (e.g., rides on) the ramp surfaces 65 and non-actuated positions where the cross pin 66 is offset from the ramp surfaces 65 and aligns with the neutral positions 67. Each groove 64 includes two groove portions 64a, 64b positioned on opposite sides of the axis 23. Each grove portion 64a, 64b includes a forward ramp 65F and a rearward ramp 65R separated from one another by the neutral position 67. During normal forward driving conditions, the cross pin 66 engages the forward ramp surfaces 65F to force the clutch members 40L, 40R axially outwardly thereby actuating the clutch mechanisms 48L, 48R. During normal rearward driving conditions, the cross pin 66 engages the rear ramp surfaces 65R to force the clutch members 40L, 40R axially outwardly thereby actuating the clutch mechanisms 48L, 48R.

Figure 5:
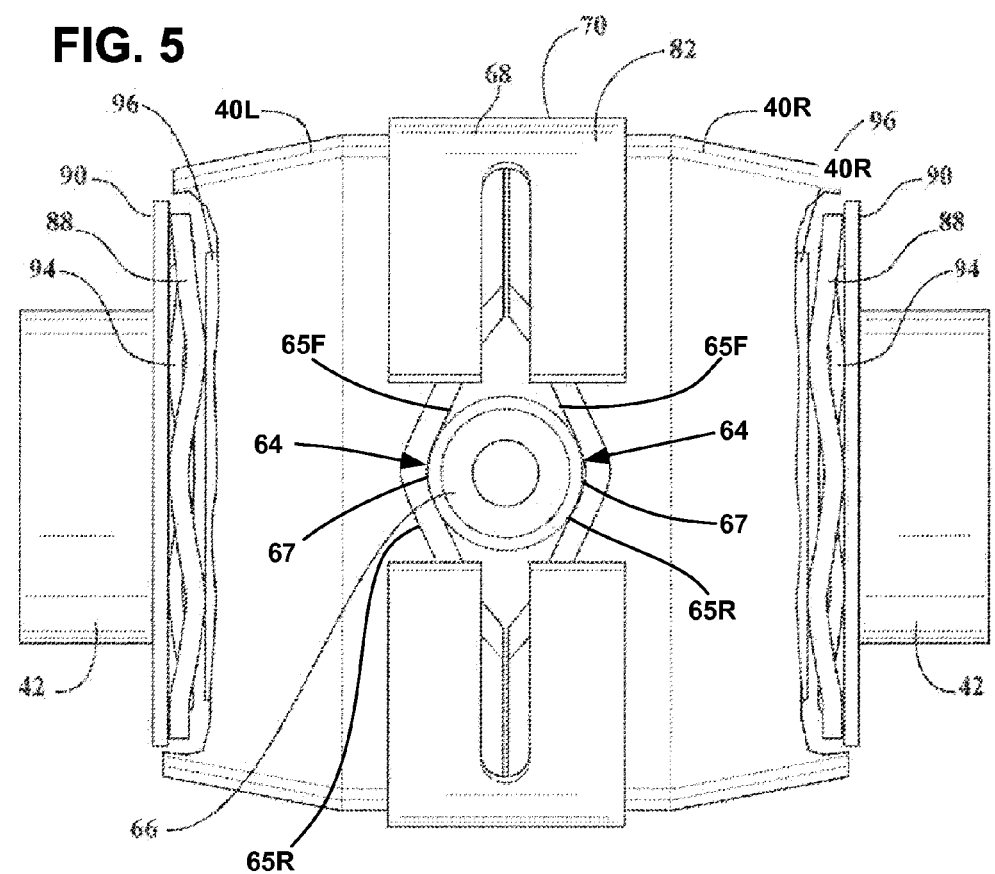
FIG. 5 is a side view of the differential mechanism and the dampening communication spring of the present teachings.

Referring to FIGS. 4 and 5, the clutch mechanisms 48L, 48R include first springs 88 that are disposed on the outboard sides of the clutch members 40L, 40R to contact an outer surface of the clutch members 40L, 40R to pre-load the clutch members 40L, 40R. The springs 88 bias the clutch members 40L, 40R in an inboard orientation against the cross pin 66. The first springs 88 can include wave springs each having a predetermined spring force. First washers 90 are disposed on the outboard sides of the first springs 88 for each of the clutch mechanisms 48, 50. Each first washer 90 has an annular recess 92. The clutch mechanisms 48L, 48R each include second springs 94 disposed in the annular recesses 92 of the first washers 90 to pre-load the clutch mechanisms 48L, 48R. The second springs 94 can include wave springs each having a predetermined spring force less than the predetermined spring force of each first spring 88. A second washer 96 may be disposed against the inboard side of each second spring 94. It should be appreciated that the springs 88, 94 are arranged in parallel for applying the pre-load to the clutch members 40 to maintain contact with the cross pin 66. In other examples, springs other than wave springs (e.g., coil springs, flat leaf springs, etc.) can be used as the first and/or second springs.

The clutch members 40L, 40R are axially moveable within the housing 12 to axially compress the clutch packs 59 of their respective clutch mechanisms 48L, 48R so as to actuate the clutch mechanisms 48L, 48R. Clutch actuation occurs when contact between the ramp surfaces 65 and the cross pin 66 forces the clutch members 40L, 40R axially outwardly to compress the clutch packs 59. The actuation forces are large enough allow a substantial amount of torque to be transferred through the clutch packs 59. In certain examples, the actuation forces are sufficiently large for the clutch packs to essentially lock the clutch members 40L, 40R relative to their respective side gears 42L, 42R such that the side gears 42L, 42R and their respective clutch members 40L, 40R rotate in unison about the axis 23.

When the cross pin 66 is aligned with the neutral positions 67 of the grooves 64 of one of the clutch members 40L, 40R, the corresponding clutch pack 59 is not axially compressed by the corresponding clutch member 40L, 40R and is therefore not actuated. When the clutch pack 59 is not actuated by its corresponding clutch member 40L, 40R, only pre-load is applied to the clutch pack 59. In this non-actuated state, the clutch plates and the friction discs can rotate relative to one another during a wheel overspeed condition. Thus, during a wheel overspeed condition, the non-actuated clutch pack corresponding to the overspeeding wheel permits the corresponding side gear 42L, 42R and its corresponding axle half shaft 30L, 30R to rotate relative to the corresponding clutch member 40L, 40R.

During normal straight driving conditions, the cross pin 66 engages the ramp surfaces 65 causing actuation of the clutch mechanisms 48L, 48R such that the clutch packs 59 prevent relative rotation between the clutch members 40L, 40R and their corresponding side gears 42L, 42R. Thus, driving torque is transferred from the differential housing 12 and cross pin 66 through the clutch members 40L, 40R, the clutch packs and the side gears 42L, 42R to the axle half shafts 30L, 30R and the wheels 17L, 17R. Thus, with both clutch packs actuated, the differential housing 12, cross pin 66, the clutch members 40L, 40R, the side gears 42L, 42R, the axle half shafts 30L, 30R and the wheels 17L, 17R all rotate in unison about the axis 23. During an overspeed condition (e.g., during a turn), the clutch member 40L, 40R corresponding to the overspeeding wheel rotates relative to the cross pin 66 such that the cross pin 66 disengages from the ramp surfaces 65 and becomes aligned with the neutral positions 67 thereby causing the corresponding clutch pack 59 to no longer be actuated. With the clutch pack 59 no longer actuated, only pre-load pressure is applied to the corresponding clutch pack 59. The pre-load pressure is sufficiently low that the de-actuated clutch permits relative rotation between the clutch member 40L, 40R and its corresponding side gear 42L, 42R to accommodate the faster rotation of the overspeeding wheel relative to its corresponding clutch member 40L, 40R, the cross pin 66 and the differential housing 12. An intermating stop arrangement 100 defined between the inboard sides of the clutch members 40L, 40R allows for only a limited range of relative rotational movement between the clutch members 40L, 40R about the axis 23. The stop arrangement 100 ensures that the clutch members 40L, 40R don't over-rotate their corresponding neutral positions 67 past the cross pin 66 during an overspeed condition. If the clutch members 40L, 40R were to over-rotate during an overspeed condition, the cross pin 66 would inadvertently actuate a de-actuated clutch by engaging the ramp 65L, 65R on the opposite side of the neutral position 67. The stop arrangement 100 prevents this from happening thereby allowing the overspeeding wheel to maintain an overspeed condition during a turn without interference from the clutch mechanisms 42L, 42R.

As illustrated in FIG. 5, the differential mechanism 38 is shown assembled. In one embodiment, the first springs 88 pre-load the clutch members 40L, 40R only from the outside to maintain constant contact between the clutch members 40L, 40R and the cross pin 66. Thus, the first springs 88 do not direct pre-load through the clutch packs of their corresponding clutch mechanisms 48L, 48R. Instead, the clutch pack preload is determined only by the second springs 94. By offsetting a "spring contact" point of the springs 88 radially outwardly outward to the clutch members 40L, 40R, the pre-load exerted by the springs 88 can be applied only to the clutch members 40L, 40R, which maintains the contact between the clutch members 40L, 40R and the cross pin 66 and allows use of higher "spring" loads since the corresponding clutch mechanisms 48L, 48R receive no additional load.

It should be appreciated that care must be taken not to increase this contact provided by springs 88 such that an excessive amount of resistance prevents a limited range of relative rotational movement about the axis 23 between the clutch members 40L, 40R and the cross pin 66 so as to prevent actuation of the clutch mechanisms 48L, 48R. For example, the pre-load provided by the first springs 88 should not prevent the cross pin 66 from riding up the ramps 65 to actuate the clutch mechanisms 42L, 42R during normal forward or reverse driving conditions.

The pre-load provided by the second springs 94 should be large enough such that the clutch packs provide sufficient resistance to rotational movement of the clutch members 40L, 40R about the axis 23 for the cross pin 66 to ride up on the ramps 65 and cause actuation of the clutch mechanisms 48L, 48R as differential housing 12 and the cross pin 66 carried therewith are rotated about the axis 23 during normal driving conditions. Also, the pre-load provided by the second springs 94 should not be so large so as to cause the wheels 17L, 17R to slip/skid relative to the ground/road surface when encountering an overspeed wheel condition. In one example, the clutch pre-load applied to each clutch pack allows the clutch packs to transfer a pre-load torque value that is less than a representative wheel slip torque value corresponding to the outside wheel during a turn. The representative wheel slip torque value (i.e., the torque required to have the wheel slip relative to the ground) is dependent upon the gross weight of the vehicle and a selected coefficient of friction between the ground and the wheel that corresponds to a low traction condition.

As described above, a limited range of relative rotation about the axis 23 is permitted between the clutch members 40L, 40R themselves and between the clutch members 40L, 40R and the cross pin 66. The range of relative rotation is limited by the stop arrangement 100 and allows for each clutch member 40L, 40R to rotate relative to the cross pin 66 and the opposite clutch member 40L, 40R when an overspeed condition takes place. For example, when the left wheel 17L experiences an overspeed condition, the clutch member 40L can rotate relative to the cross pin 66 and the clutch member 40R from a first rotational position where the cross pin 66 engages a corresponding ramp surface 65 of the clutch member 40L to a second rotation position where the cross pin 66 aligns with the neutral position 67 of the clutch member 40L. With the clutch member 40L in the first rotational position, the clutch mechanism 42L is actuated and with the clutch member 40L in the second rotational position the clutch mechanism 42L is de-actuated. The range of relative rotation permitted by the stop arrangement 100 has a rotational angle that corresponds to the rotational distance between the first and second rotational positions of the clutch member 40L relative to the cross pin 66 and the clutch member 40R. Similarly, when the right wheel 17R experiences an overspeed condition, the clutch member 40R can rotate relative to the cross pin 66 and the clutch member 40L from a first rotational position where the cross pin 66 engages a corresponding ramp surface 65 of the clutch member 40R to a second rotation position where the cross pin 66 aligns with the neutral position 67 of the clutch member 40R. With the clutch member 40R in the first rotational position, the clutch mechanism 42R is actuated and with the clutch member 40R in the second rotational position the clutch mechanism 42R is de-actuated. The range of relative rotation permitted by the stop arrangement 100 has a rotational angle that corresponds to the rotational distance between the first and second rotational positions of the clutch member 40R relative to the cross pin 66 and the clutch member 40L.

The differential can also include a structure that provides a limited/controlled amount of frictional resistance that resists movement of the clutch members 40L, 40R between the first and second rotational positions. The frictional resistance is small enough to be overcome in an overspeed condition. Thus, the frictional resistance is not large enough to prevent the clutch members from moving between the first and second rotational positions. However, the frictional resistance is large enough to prevent erratic motion within the mechanical travel limits defined by the stop arrangement 100 so as to provide for smoother operation and reduced noise. In certain examples, the structure for providing frictional resistance may be rotationally fixed relative to the cross pin 66 and may engage both of the clutch members 40L, 40R to generate a limited friction force that must be overcome for either of the clutch members 40L, 40R to rotate relative to the cross pin 66. In certain examples, the structure for providing frictional resistance can include a spring that applies a biasing force to the clutch members 40L, 40R. In certain examples, the structure for generating frictional resistance is a sleeve or circumferential clamp that is anchored against rotation relative to the cross pin 66 and that clamps about the outer circumferences of the clutch members 40L, 40R so as to resist rotational movement of the clutch members 40L, 40R about the axis 23 relative to the cross pin 66. In one example, the sleeve/clamp can include structure having elastic characteristics so as to apply a spring biased load to the circumferences of the clutch members 40L, 40R. In certain examples, the sleeve/clamp can be mounted about the circumferences of the clutch members 40L, 40R and can traverse/bridge the interface between the inboard sides of the clutch members 40L, 40R.

In one example, the structure for providing frictional resistance may include a dampening communication spring 70 disposed over the outer circumference of the clutch members 40L, 40R (FIGS. 1 and 4) and cooperating with the cross pin 66. As illustrated in FIG. 4, the dampening communication spring 70 is generally circular (e.g., cylindrical) in shape. The dampening communication spring 70 includes a first arm portion 78 extending circumferentially and having a first slot 80 extending circumferentially inward from one end thereof. The dampening communication spring 70 includes a second arm portion 82 opposing the first arm portion 78. The second arm portion 82 extends circumferentially and has a first slot 84 extending circumferentially inward from one end thereof. The dampening communication spring 70 has a central aperture 86 extending radially therethrough to receive one end of the cross pin 66. The dampening communication spring 70 is made of a spring material such as a metal material.

As illustrated in FIG. 5, the dampening communication spring 70 is assembled over the clutch members 40L, 40R. One end of the cross pin 66 is disposed in and extended through the central aperture 86 in the dampening communication spring 70 and extends through the clutch members 40L, 40R. The dampening communication spring 70 is grounded to the cross pin 66 and outside of each of the clutch members 40L, 40R such that there are multiple, in this case three, points of contact of the spring 70 to a remainder of the differential mechanism 38. By applying a spring coupling between the clutch members 40 of the locking differential 10, control of the interaction of the clutch members 40L, 40R can be achieved. The dampening communication spring 70 prevents erratic motion within the mechanical travel limits. This provides for smoother operation and reduced noise. The dampening communication spring 70 also provides feedback to the differential clutch members 40 from the differential carrier. This provides ultimate control of the dampening back to the driveline.

Figure 6:
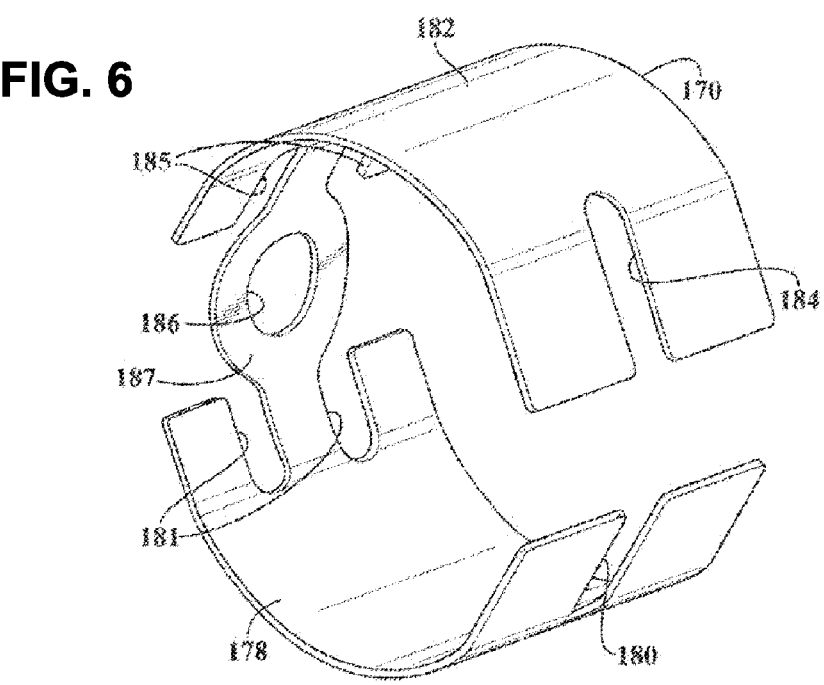
FIG. 6 is a perspective view of another representative example of the dampening communication spring of the present teachings.

Referring to FIG. 6, another representative example, according to the present teachings, of the dampening communication spring 70 is shown. Like parts of the dampening communication spring 70 have like reference numerals increased by one hundred (100). In this representative example, the dampening communication spring 170 is generally circular in shape. The dampening communication spring 170 includes a first arm portion 178 extending circumferentially and having a first slot 180 extending circumferentially inward from one end thereof. The first arm portion 178 also has a pair of second slots 181 extending circumferentially inward from the other end thereof and spaced axially relative to each other. The dampening communication spring 170 includes a second arm portion 182 opposing the first arm portion 178. The second arm portion 182 extends circumferentially and has a first slot 184 extending circumferentially inward from one end thereof. The second arm portion 182 also has a pair of second slots 185 extending circumferentially inward from the other end thereof and spaced axially relative to each other. The dampening communication spring 170 has a bridge portion 187 extending circumferentially between the first arm portion 178 and second arm portion 182. The bridge portion 187 has a central aperture 186 extending radially therethrough to receive one end of the cross pin 66. The bridge portion 187 has an axial width less than an axial width of the first arm portion 178 and second arm portion 182. The dampening communication spring 170 is made of a spring material such as a metal material. The assembly and operation of the dampening communication spring 170 is similar to the dampening communication spring 70.

The present teachings have been described in great detail in the foregoing specification, and it is believed that various alterations and modifications of the many aspects of the present teachings will become apparent to those ordinary skilled in the art from a reading and understanding of the specification. It is intended that all such alterations and modifications are included in the present teachings, insofar as they come within the scope of the appended claims.

What is claimed is:

1. A differential for a vehicle comprising:
    a rotatable housing and a differential mechanism supported in said housing, said housing being rotatable about an axis of rotation, said differential mechanism including a pair of clutch members disposed along the axis of rotation;
    a pair of side gears operatively adapted for rotation with a corresponding pair of axle half shafts, and a pair of clutch mechanisms operable for transferring torque between the clutch members and their corresponding side gears when actuated;
    said clutch members being axially moveable along the axis or rotation within said housing to actuate a respective clutch mechanism;
    each of said clutch members presenting an inwardly directed face, each said face including a groove disposed in facing relationship with respect to the other, and a cross pin received in said groove and operatively connected for rotation with said housing about the axis of rotation; and
    a dampening communication spring disposed over an outer circumference of said clutch members and cooperating with said cross pin to control interaction of said clutch members; wherein said dampening communication spring has a central aperture extending radially therethrough to receive one end of said cross pin.

2. A differential as set forth in claim 1 wherein said dampening communication spring includes a first arm portion extending circumferentially and having a first slot extending circumferentially inward from one end thereof.

3. A differential as set forth in claim 2 wherein said dampening communication spring includes a second arm portion opposing said first arm portion.

4. A differential as set forth in claim 3 wherein said second arm portion extends circumferentially and has a first slot extending circumferentially inward from one end thereof.

5. A differential as set forth in claim 4 wherein said first arm portion has a pair of second slots extending circumferentially inward from the other end thereof and spaced axially relative to each other.

6. A differential as set forth in claim 5 wherein said second arm portion has a pair of second slots extending circumferentially inward from the other end thereof and spaced axially relative to each other.

7. A differential as set forth in claim 6 wherein said dampening communication spring has a bridge portion extending circumferentially between said first arm portion and said second arm portion.

8. A differential as set forth in claim 7 wherein said bridge portion has said central aperture extending radially therethrough to receive one end of said cross pin.

9. A differential as set forth in claim 8 wherein said bridge portion has an axial width less than an axial width of the first arm portion and second arm portion.

10. A differential as set forth in claim 1 wherein said dampening communication spring is made of a metal material.

11. A drive train including the differential of claim 1, the drive train including a drive shaft coupled to a drive gear that engages a ring gear carried by the housing, wherein the drive shaft and the drive gear provide torque for rotating the housing about the axis of rotation.

12. An axle assembly including the differential of claim 1, the axle assembly including the axle half shafts, and the axle half shafts being co-axially aligned along the axis of rotation.

13. A differential for a vehicle comprising:
    a rotatable housing and a differential mechanism supported in said housing, said housing being rotatable about an axis of rotation, said differential mechanism including a pair of clutch members disposed along the axis of rotation;
    a pair of side gears operatively adapted for rotation with a corresponding pair of axle half shafts, and a pair of clutch mechanisms operable for transferring torque between the clutch members their corresponding side gears when actuated;
    said clutch members being axially moveable along the axis or rotation within said housing to actuate a respective clutch mechanism;
    each of said clutch members presenting an inwardly directed face, each said face including a groove disposed in facing relationship with respect to the other, and a cross pin received in said groove and operatively connected for rotation with said housing about the axis or rotation; and
    a spring sleeve anchored relative to the cross pin to prevent relative rotation between the cross pin and the spring sleeve about the axis of rotation, wherein the spring sleeve includes a first portion that clamps on one of the clutch members and a second portion that clamps on the other of the clutch members.

14. The differential of claim 13, wherein spring sleeve traverses an interface between the clutch members.

15. A drive train including the differential of claim 13, the drive train including a drive shaft coupled to a drive gear that engages a ring gear carried by the housing, wherein the drive shaft and the drive gear provide torque for rotating the housing about the axis of rotation.

16. An axle assembly including the differential of claim 13, the axle assembly including the axle half shafts, and the axle half shafts being co-axially aligned along the axis of rotation.

17. A differential for a vehicle comprising:
a rotatable housing and a differential mechanism supported in said housing, said housing being rotatable about an axis of rotation, said differential mechanism including a pair of clutch members disposed along the axis of rotation;
a pair of side gears operatively adapted for rotation with a corresponding pair of axle half shafts, and a pair of clutch mechanisms operable for transferring torque between the clutch members and their corresponding side gears when actuated;
said clutch members being axially moveable along the axis or rotation within said housing to actuate a respective clutch mechanism;
each of said clutch members presenting an inwardly directed face, each said face including a groove disposed in facing relationship with respect to the other, and a cross pin received in said groove and operatively connected for rotation with said housing about the axis or rotation; and
a dampening structure fixed to the cross pin such that relative rotation between the dampening structure and the cross pin is prevented, wherein the dampening structure frictionally engages circumferential surfaces of the clutch members to resist rotational movement between the clutch members about the axis of rotation.

18. A drive train including the differential of claim 17, the drive train including a drive shaft coupled to a drive gear that engages a ring gear carried by the housing, wherein the drive shaft and the drive gear provide torque for rotating the housing about the axis of rotation.

19. An axle assembly including the differential of claim 17, the axle assembly including the axle half shafts, and the axle half shafts being co-axially aligned along the axis of rotation.

\* \* \* \* \*